United States Patent
Benedix et al.

(10) Patent No.: US 6,820,197 B2
(45) Date of Patent: Nov. 16, 2004

(54) DATA PROCESSING SYSTEM HAVING CONFIGURABLE COMPONENTS

(75) Inventors: Alexander Benedix, München (DE); Georg Braun, München (DE); Bernd Klehn, München (DE)

(73) Assignee: Infineon Technologies AG, Munich (DE)

( * ) Notice: Subject to any disclaimer, the term of this patent is extended or adjusted under 35 U.S.C. 154(b) by 522 days.

(21) Appl. No.: 10/000,690

(22) Filed: Nov. 15, 2001

(65) Prior Publication Data
US 2003/0093587 A1 May 15, 2003

(30) Foreign Application Priority Data
Nov. 15, 2000 (DE) .......................................... 100 56 471

(51) Int. Cl.[7] .......................................... G06F 15/177
(52) U.S. Cl. ...................... 713/1; 713/2; 710/8; 710/10
(58) Field of Search .......................... 710/8, 10; 713/1, 713/2, 100; 326/40

(56) References Cited

U.S. PATENT DOCUMENTS

| | | | | |
|---|---|---|---|---|
| 5,493,239 A | * | 2/1996 | Zlotnick ....................... | 326/40 |
| 5,694,056 A | * | 12/1997 | Mahoney et al. ............. | 326/38 |
| 5,881,281 A | | 3/1999 | Gates et al. | |
| 5,987,533 A | * | 11/1999 | Hong ............................ | 710/9 |
| 5,995,988 A | * | 11/1999 | Freidin et al. ............... | 708/232 |
| 6,614,703 B2 | * | 9/2003 | Pitts et al. ................... | 365/221 |
| 6,661,251 B1 | * | 12/2003 | Dowen et al. ................ | 326/37 |
| 2003/0093587 A1 | * | 5/2003 | Benedix et al. ............... | 710/2 |

OTHER PUBLICATIONS

"The Principle of Boundary–Scan Architecture", Boundary Scan Tutorial, Website: www.asset–intertech.com/tutorial/principl.
U. Tietze et al.: Halbleiter–Schaltungstechnik (Semiconductor Circuit Technology), 8th Edition, Springer Verlag, 1986, pp. 252–253.

* cited by examiner

*Primary Examiner*—Fritz Fleming
(74) *Attorney, Agent, or Firm*—Laurence A. Greenberg; Werner H. Stemer; Gregory L. Mayback

(57) ABSTRACT

The data processing system has configurable components, which each have a configuration register for storing configuration data. A serial bus couples the configuration registers to a non-volatile memory so that a serial transmission of data from the non-volatile memory to the configuration registers is made possible, for example when the system is booted up. The system already functions even if complex bus systems, such as extensively parallel high-speed buses, for example, are not yet available in a configuration process of the system. The system can be used in all data processing systems, in particular in mobile applications.

8 Claims, 2 Drawing Sheets

DATA PROCESSING SYSTEM HAVING CONFIGURABLE COMPONENTS

BACKGROUND OF THE INVENTION

Field of the Invention

The invention relates to a data processing system with configurable components.

In data processing systems, for example in computer systems, it is usually necessary to configure configurable components whenever the computer system is first booted up. This booting up when computer systems are switched on usually lasts for a relatively long time, often for several minutes. Reasons for this are, for example, the complex configuration of complex systems, for example a system bus, a memory bus, hard disks, hard-disk controllers, and the like.

The configuration data of configurable components are usually stored in configuration registers of the respective components during the booting up operation.

In particular in mobile data processing systems, for example in what are referred to as Internet appliances, such a complex and long-lasting initiation process of the system is particularly undesirable.

It has already been known to write configuration data from configuration registers of configurable components into a nonvolatile memory when shutting down a data processing system, and to write the configuration data from the non-volatile memory back into the corresponding registers of the configurable components when the system is switched on again and booted up. This is referred to, for example, as a "suspend to/from disk", and in this context the non-volatile memory is a hard-disk memory of the system. The exchange of data between configuration registers and the non-volatile memory is carried out here via data buses of the data processing system, for example a system bus, a memory bus, etc. These data buses are normally parallel high-speed bus systems which, to operate satisfactorily, already require correct configuration of the components involved, for example the hard-disk controllers, hard disk, system bus, and memory bus. The switching-off and switching-on operations which are shortened in this way for data processing systems are consequently still relatively long-lasting.

A circuit configuration having configurable host adapter cards is disclosed in U.S. Pat. No. 5,881,281. There, configuration data for configuring the host adapter can be read in serially after the system is reset.

FIG. 1 shows a data processing system having configurable components C1, C2, C3 according to the prior art. The configurable components C1, C2, C3 each have a configuration register REG1, REG2, REG3 wherein configuration data of the associated configurable components C1, C2, C3 can be stored. Each component C1, C2, C3 is connected to its respective configuration register REG1, REG2, REG3 via a high-speed bus system BUS1, which is embodied as a parallel bus system, via one interface BUS-IF in each case.

In what is referred to as the boundary scan method, test data inputs and outputs of integrated circuits are connected to one another in a shift register chain in order to enable self-tests of these integrated circuits to be carried out.

SUMMARY OF THE INVENTION

It is accordingly an object of the invention to provide a data processing system with configurable components, which overcomes the above-mentioned disadvantages of the heretofore-known devices and methods of this general type and wherein shorter time periods are required to boot up and shut down the system.

With the foregoing and other objects in view there is provided, in accordance with the invention, a data processing system having configurable components, comprising:

a plurality of configuration registers for storing configuration data for configuring the configurable components, the configuration registers each having an input and an output;

a non-volatile memory;

a serial bus connecting the configuration registers to the non-volatile memory and enabling a serial transmission of data from the configuration registers to the non-volatile memory and from the non-volatile memory to the configuration registers;

a plurality of shift registers each having a serial input and a serial output and each being connected to a respective the configuration register for transmitting configuration data, and the shift registers being coupled via the serial inputs and the serial outputs to the serial bus to form a shift register chain.

In other words, the objects of the invention are satisfied with a data processing system having configurable components and having:

a plurality of configuration registers wherein configuration data for configuring the components can be stored and which have inputs and outputs; and a serial bus which couples the configuration registers to a non-volatile memory in such a way that a serial transmission of data both from the configuration registers to the non-volatile memory and from the nonvolatile memory to the configuration registers is made possible, the configuration registers being coupled to one shift register each for the purpose of transmitting configuration data, and the shift registers having serial inputs and outputs via which the shift registers are connected to the serial bus to form a shift register chain.

The data processing system having configurable components is based here on the principle of introducing a serial bus via which the configuration registers can be read out and the data written into the non-volatile memory when the system is shut down, for example, and conversely the data can be written back into the respective configuration registers from the nonvolatile memory via the serial bus when the system is booted up, for example. During the booting up and shutting down operations, the configuration process which can be carried out very quickly is thus possible because, for this to be carried out, it is no longer necessary for a high-speed bus, whose configuration is itself costly, to be already available. Instead, the serial bus, and thus the high-speed booting up of the system, function even without a high-speed bus or other complex bus systems. High-speed booting up and shutting down of the system has advantages, in particular in mobile systems.

Accordingly, the serial bus is used to write configuration data stored in the non-volatile memory directly into all the configuration registers which are necessary for initializing and operating various components of the system.

In accordance with the present invention, the configuration registers for transmitting configuration data are also coupled to one shift register each, the shift registers having serial inputs and outputs via which the shift registers are connected to the serial bus to form a shift register chain.

In accordance with a preferable feature of the invention, the serial bus has a bus width of 1 bit.

The serial transmission of data between a non-volatile memory and the configuration registers using the serial bus can be a bit-serial transmission of data.

When the data processing system is started or booted up for the first time, it is necessary to carry out a relatively time-consuming configuration process. However, during all the further booting up and shutting down operations of the system it is possible for the states of the configuration registers, that is to say the configuration data which represent the current configuration of the respective system component, to be read out via the serial bus and stored in the non-volatile memory. The sequencing control of these writing and reading operations can be controlled, for example, with the operating system or the BIOS (Basic Input/Output System) of the system.

If the configuration of the system happens to change, for example as a result of expansions of the hardware, that is to say by adding further components to the system, it may be necessary to allow a conventional, costly configuration process to run when the system is first booted up after its expansion. During the next shutting down operation, the acquired configuration data can in turn be transmitted via the serial bus into the non-volatile memory and stored there. During the next system start, and all further system starts, it is then possible to achieve high-speed booting up by transmitting the configuration data from the non-volatile memory into the configuration registers of the respective components.

With the described system, the time period during which the system boots up and during which it is already consuming power, but cannot yet be used, is therefore significantly shortened.

The configuration register can be the same as the shift register here. Alternatively, it is possible, for example, to connect a shift register within a component to a plurality of configuration registers of the component. Shift registers can be implemented in a particularly simple way, for example with a chain of flip-flops, which permit information applied to an input of the shift register, configuration data in this case, to be shifted onward by one flip-flop at each clock pulse.

In accordance with an advantageous feature of the invention, the shift registers form a ring with the serial bus and the non-volatile memory. Such a ring-shaped shift register chain can, for example, be operated during the booting up of the system in such a way that the configuration data is shifted from the non-volatile memory into the respective correct shift register of the respective component, for example clocked with a clock signal and, for example, bit-by-bit. When the system is shut down, the configuration data can be read out of the shift registers serially and written into the non-volatile memory by means of the serial bus.

The shift registers can each have a data input, a data output and a clock signal input here. The shift registers of the individual components are connected one behind the other, or in series, here in such a way that in each case an output is connected to the input of a shift register of another component. The input of a first shift register is connected to an output of the non-volatile memory, and the output of a last shift register in the shift register chain is connected to the input of a non-volatile memory.

In accordance with a further, advantageous embodiment of the present invention, the shift registers are configured for forward and backward shifting. Accordingly, a ring structure is not formed in the shift register chain, rather the shift registers can either be connected serially or in parallel by their input/output interfaces to an input and output of the non-volatile memory.

In a further, advantageous embodiment of the present invention, the shift registers have an interface for the parallel inputting and outputting of data, via which interface they are connected to the configuration registers. If the shift registers are not the same as the configuration registers, the configuration data can be transmitted in parallel from the already loaded shift registers into the configuration registers when the system is booted up. Conversely, when the system is shutdown, the configuration data can be transmitted in parallel from the configuration registers into the respectively assigned shift registers. The configuration data which is then stored in the shift registers can subsequently be transmitted serially from the shift registers into the non-volatile memory by means of the serial bus.

In accordance with another feature of the invention, the shift registers each have a clock input to which a clock signal can be fed. The clock signal inputs of the shift registers can be connected to one another here. The non-volatile memory can also have a clock input which can be driven with the clock signal which can be fed to the shift registers. The sequence of the serial transmission of data can be controlled using the clock signal. In doing so, the configuration data can be shifted from one flip-flop in the shift register chain to the next at each clock pulse. The protection and backing up of the configuration data can be controlled, for example by an operating system or the BIOS of a computer system, using the clock signal.

In accordance with a further, advantageous embodiment, the non-volatile memory is a magnetic disk memory. Magnetic disk memories, for example hard disks, are usually present in computer systems in any case.

In accordance with again a further, advantageous embodiment of the present invention, the non-volatile memory is a volatile memory which is supplied from an additional voltage source.

The additional voltage source may be, for example, a battery or a capacitor with a very long storage time.

The non-volatile memory can in this case be advantageously embodied as a register which has the same number of serially arranged memory locations as results from the product of the number of shift registers and number of memory locations of the shift registers.

Other features which are considered as characteristic for the invention are set forth in the appended claims.

Although the invention is illustrated and described herein as embodied in a data processing system having configurable components, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
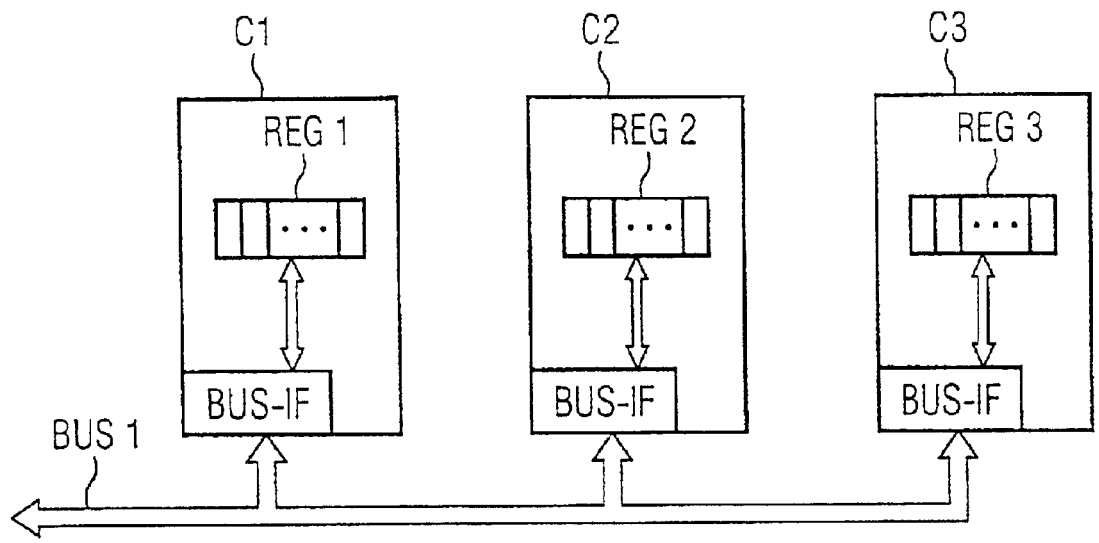
FIG. 1 is a block diagram of data processing system having configurable components according to the prior art.

A description of the data processing system according to FIG. 1, which belongs to the prior art, is already given in the introduction to the description. For this reason, the description will not be repeated at this point.

Figure 2:
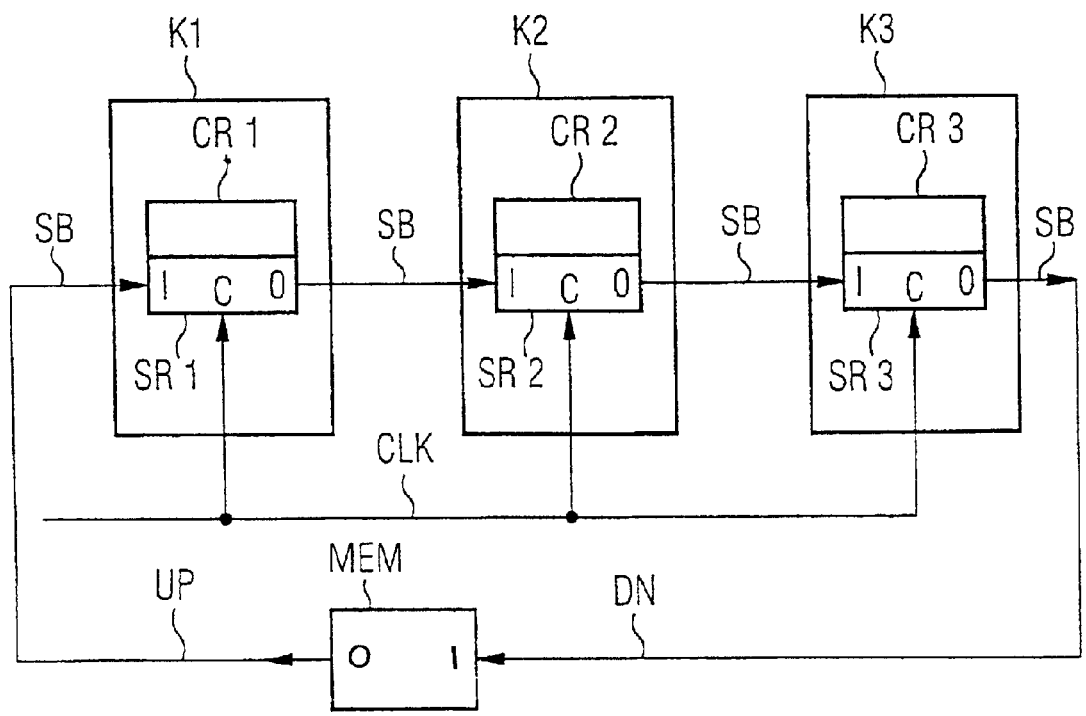
FIG. 2 is a block diagram of an exemplary embodiment of the invention.

Referring now once more to the figures of the drawing in detail and first, particularly, to FIG. 2 thereof, there is shown a first embodiment according to the invention of a data processing system having configurable components and having a ring-shaped shift register chain. A plurality of configurable components K1, K2, K3 are provided here in the data processing system. Each of the components has a configuration register CR1, CR2, CR3 and a shift register SR1, SR2, SR3. The configuration and shift registers are coupled to one another in the respective components K1, K2, K3. The shift registers SR1, SR2, SR3 are connected to one another and to a non-volatile memory MEM using a serial bus SB. In addition, a clock signal CLK can be fed to the shift registers SR1, SR2, SR3 at a clock input C. The shift registers SR1, SR2, SR3 also each have an input I and an output O. The input I of the first shift register SR1 is connected to an output O of a non-volatile memory MEM via the serial bus SB. The input I of the second shift register SR2 is connected to the output O of the first shift register SR1, and the input I of the third shift register SR3 is connected to the output O of the second shift register SR2. The output O of the third shift register SR3 is connected to an input I of the non-volatile memory MEM.

With the data processing system as described, it is possible, by means of the shift registers SR1, SR2, SR3 arranged in a register chain, to easily read out the configuration data serially from the shift registers SR1, SR2, SR3 and into the non-volatile memory MEM when the system is shut down, and easily write the configuration data from the non-volatile memory MEM back into the shift registers SR1, SR2, SR3 when the system is booted up, using the serial bus SB in each case. In contrast to high-speed bus systems which are usually present and which connect the components K1, K2, K3, with this additional serial bus SB it is possible for faster initialization of the components with configuration data to take place without a high-speed bus itself having to be configured or initialized. Consequently, the time period which is necessary for booting up and shutting down the system, and thus for switching on and off, is significantly shortened. This is advantageous in particular in mobile small-scale devices wherein, on the one hand, a fast access to the functionality of the system and, on the other hand, long battery running times are desired. The shift registers can be of particularly simple design here.

Figure 3:
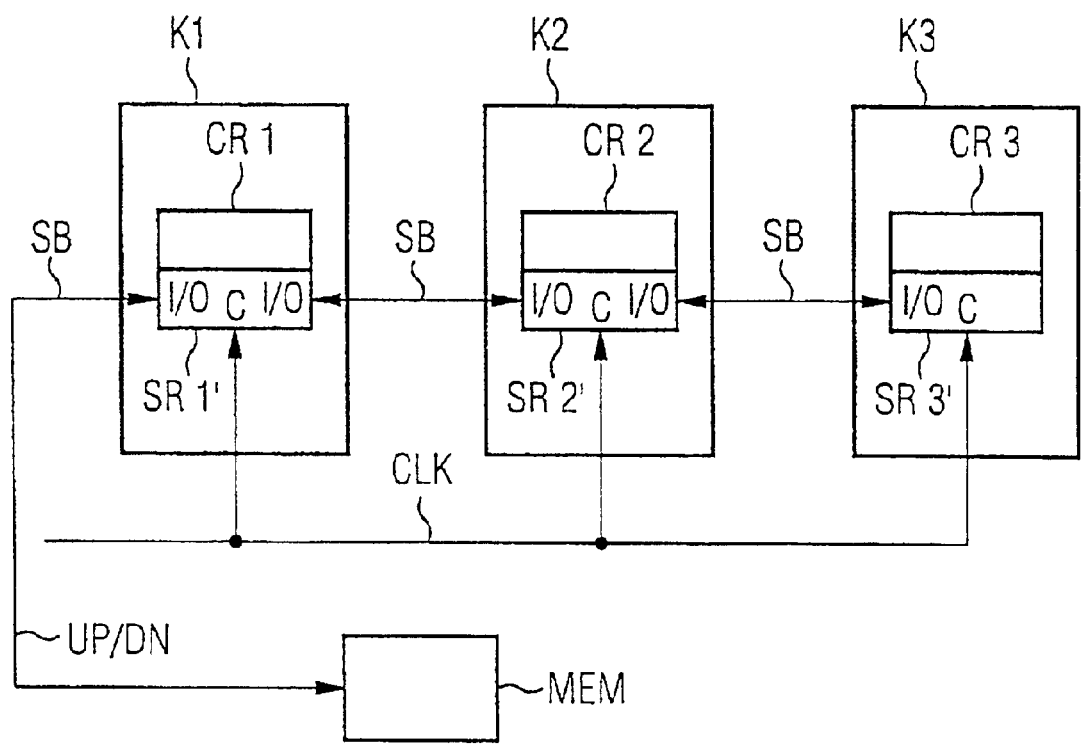
FIG. 3 is a block diagram of a further exemplary embodiment of the present invention.

The exemplary embodiment according to FIG. 3 is modified in comparison with that of FIG. 2 to the extent that, instead of shift registers SR1, SR2, SR3 which can only be shifted forward, shift registers SR1', SR2', SR3' which can be shifted forward and backward are used. These each have inputs and outputs I/O for optionally reading in or pushing out configuration data instead of inputs I and outputs O. The ring arrangement according to FIG. 2 of the shift register chain can be dispensed with and only the input/output interface I/O of a shift register of a component, for example that of the first shift register SR1', is now connected to an input and output of the non-volatile memory.

Whereas in the case of the non-volatile memory according to FIG. 3 the configuration data is stored and read out in accordance with a LIFO (Last-In First-Out) principle, the configuration data in the case of the non-volatile memory according to FIG. 2 is read out in such a way that the data which can be written first here is read out first in accordance with the FIFO (First-In First-Out) principle.

The exemplary embodiment according to FIG. 3 has, like the data processing system according to FIG. 2, the advantage that the serial bus SB does not have to be configured itself. Consequently, the configuration registers CR1, CR2, CR3 can be written to very quickly and directly from a non-volatile MEM during an initialization operation of the system. When the system is shut down, the serial bus SB permits configuration data to be transmitted quickly and simply from configuration registers CR1, CR2, CR3 to a non-volatile memory MEM.

Instead of the configuration shown in FIG. 3, where shift registers with forward and backward shifting are used, it is possible also to provide a parallel configuration of the shift registers SR1, SR2, SR3 instead of the serial configuration shown. The non-volatile memory MEM can have here, for example, as many input/output interfaces as the number of shift registers present. In each case, one input/output interface of the non-volatile memory MEM can be connected to in each case one input/output I/O of in each case one shift register SR1', SR2', SR3' by means of one serial bus in each case. At the same time, the non-volatile memory MEM can have, for example, a plurality of registers which are arranged in parallel and are each assigned to a shift register, or a register which can be switched over, for example with a multiplexer, to the various shift registers SR1', SR2', SR3'. In such a case, the described advantages of the invention are retained.

We claim:

1. A data processing system having configurable components, comprising:

a plurality of configuration registers for storing configuration data for configuring the configurable components, said configuration registers each having an input and an output;

a non-volatile memory;

a serial bus connecting said configuration registers to said non-volatile memory and enabling a serial transmission of data from said configuration registers to said non-volatile memory and from said non-volatile memory to said configuration registers;

a plurality of shift registers each having a serial input and a serial output and each being connected to a respective said configuration register for transmitting configuration data, and said shift registers being coupled via said serial inputs and said serial outputs to said serial bus to form a shift register chain.

2. The data processing system according to claim 1, wherein said shift registers form a ring with said serial bus and said non-volatile memory.

3. The data processing system according to claim 1, wherein said shift registers are configured for forward and backward shifting.

4. The data processing system according to claim 1, wherein said shift registers have an interface for parallel inputting and outputting of data, and said interface connects said shift registers to said configuration registers.

5. The data processing system according to claim 1, wherein said shift registers each have a clock input for receiving a clock signal.

6. The data processing system according to claim 1, wherein said non-volatile memory is a magnetic disk memory.

7. The data processing system according to claim 1, wherein said non-volatile memory is a volatile memory supplied from an additional voltage source.

8. The data processing system according to claim 1, wherein said serial bus has a bus width of 1 bit.

* * * * *